United States Patent
Ng et al.

(10) Patent No.: US 8,300,431 B2
(45) Date of Patent: Oct. 30, 2012

(54) CONSTANT-CURRENT CONTROL MODULE USING INVERTER FILTER MULTIPLIER FOR OFF-LINE CURRENT-MODE PRIMARY-SIDE SENSE ISOLATED FLYBACK CONVERTER

(75) Inventors: Chik Wai (David) Ng, Hong Kong (HK); Hing Kit Kwan, Hong Kong (HK); Po Wah (Patrick) Chang, Kowloon (HK); Wai Kit (Victor) So, Hong Kong (HK); Kwok Kuen (David) Kwong, Davis, CA (US)

(73) Assignee: Hong Kong Applied Science and Technology Research Institute Co., Ltd., Hong Kong (HK)

( * ) Notice: Subject to any disclaimer, the term of this patent is extended or adjusted under 35 U.S.C. 154(b) by 455 days.

(21) Appl. No.: 12/718,707

(22) Filed: Mar. 5, 2010

(65) Prior Publication Data
US 2011/0216559 A1    Sep. 8, 2011

(51) Int. Cl.
*H02M 3/335* (2006.01)
(52) U.S. Cl. .................... 363/21.12; 323/282
(58) Field of Classification Search ............ 363/17, 363/20, 21.12–21.18, 56.12, 80, 98; 323/222, 323/282–288, 299
See application file for complete search history.

(56) References Cited

U.S. PATENT DOCUMENTS

| | | | |
|---|---|---|---|
| 4,791,909 A * | 12/1988 | Kalthoff | 126/21 A |
| 6,707,283 B1 | 3/2004 | Ball | |
| 6,862,194 B2 | 3/2005 | Yang | |
| 6,977,824 B1 | 12/2005 | Yang | |
| 7,012,819 B2 * | 3/2006 | Feldtkeller | 363/21.01 |
| 7,358,706 B2 * | 4/2008 | Lys | 323/222 |

OTHER PUBLICATIONS

Harper, "Understand quasi-resonant,resonant converters", EE Times—India, Jan. 21, 2009.

* cited by examiner

*Primary Examiner* — Rajnikant Patel
(74) *Attorney, Agent, or Firm* — Stuart T. Auvinen; gPatent LLC

(57) ABSTRACT

A fly-back AC-DC power converter has a constant-current control loop that senses the primary output current in a transformer to control the secondary output without an expensive opto-isolator. A primary-side control circuit can use either a Quasi-Resonant (QR) or a Pulse-Width-Modulation (PWM) control loop to switch primary current through the transformer on and off. A feedback voltage is compared to a primary-side voltage sensed from the primary current loop to turn the switch on and off. A multiplier loop generates the feedback voltage using a multiplier. A level-shift inverter and a low-pass filter act as the multiplier by multiplying an off duty cycle of the switch by the feedback voltage to generate a filtered voltage. A high-gain error amp compares the filtered voltage to a reference voltage to generate the feedback voltage. The multiplier produces a simple relationship between the secondary current and the reference voltage, yielding simplified current control.

20 Claims, 9 Drawing Sheets

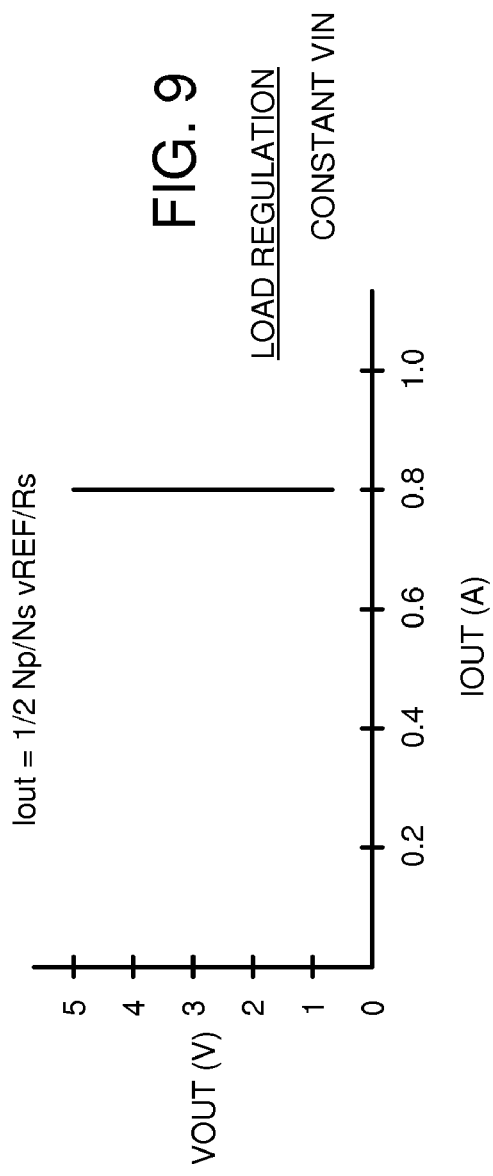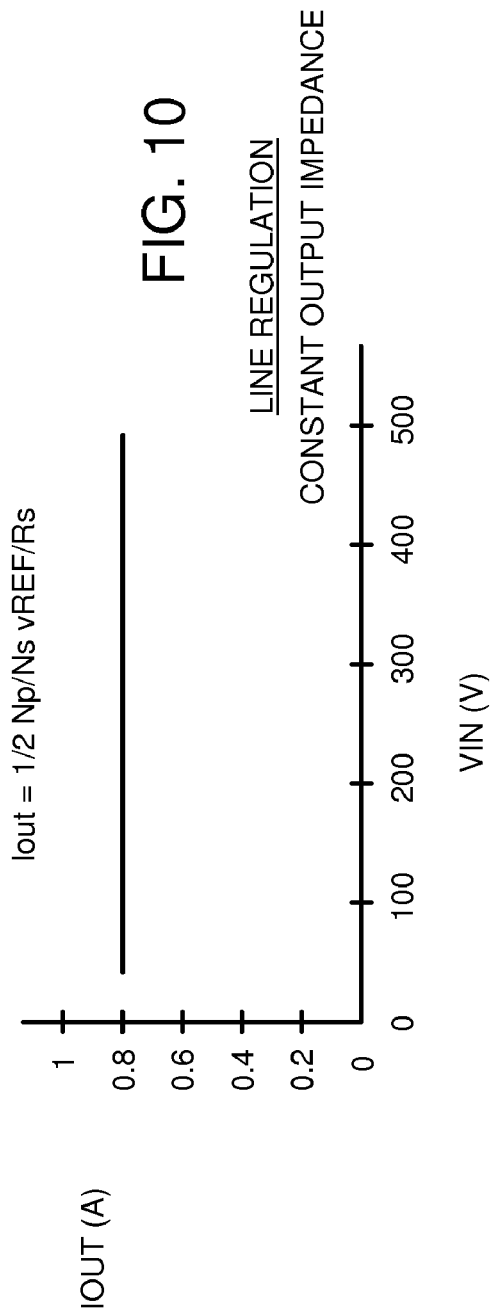

CONSTANT-CURRENT CONTROL MODULE USING INVERTER FILTER MULTIPLIER FOR OFF-LINE CURRENT-MODE PRIMARY-SIDE SENSE ISOLATED FLYBACK CONVERTER

FIELD OF THE INVENTION

This invention relates to power converters, and more particularly to fly-back converters with primary side regulation using multipliers.

BACKGROUND OF THE INVENTION

Power converters are useful in many applications, such as converting Alternating-Current (AC) from a power outlet to Direct Current (DC) for use in electronic devices. In cathode-ray tubes (CRT's), a fly-back inverter was used to block the electron beam when the raster dot was retracing or flying back to the beginning on the next raster line in the display. This class of power converters is still known as a fly-back converter, even though they are used in many non-CRT applications, such as for driving light-emitting diodes (LED's) and chargers.

Control circuitry is needed to produce a constant DC output current. A transformer may be used to isolate the primary side connected to the AC power from the DC output side for enhanced safety. Opto-isolators have been used to isolate the control circuitry, but these opto-isolators are relatively expensive and do not integrate well with integrated circuits (IC's).

Rather than connect the control circuitry to the secondary (DC) side of the transformer, the control circuitry can connect to the primary (AC) side. Heat dissipation, form factors, component counts, and costs can be reduced with primary-side sensing regulators (PSR) and control due to the higher efficiency and elimination of the opto-isolator.

While a variety of fly-back converters are known, many of these only support Pulse-Width-Modulation (PWM) control. Some applications could benefit from other control methods, such as Quasi-Resonant (QR), which yields reduced Electro-Magnetic Interference (EMI) and is better suited for solid-state lighting and charger applications.

What is desired is a fly-back converter with primary-side control that does not need an opto-isolator. A fly-back converter that supports both PWM and QR control is desirable that produces a constant current drive. Current accuracy is desirable using a circuit that is modeled by simple equations.

BRIEF DESCRIPTION OF THE DRAWINGS

FIG. 9 is an idealized graph showing load regulation using the circuit of FIG. 1.

FIG. 10 is an idealized graph showing line regulation using the circuit of FIG. 1.

DETAILED DESCRIPTION

The present invention relates to an improvement in power converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors realize that a primary-side control circuit can use either a Quasi-Resonant (QR) or a Pulse-Width-Modulation (PWM) control loop to switch primary current through a transformer on and off. A feedback voltage is compared to a primary-side voltage sensed from the primary current loop to turn the switch on and off. A multiplier loop generates the feedback voltage using a multiplier.

The inventors have realized that a level-shift inverter and a low-pass filter can act as a multiplier that multiplies a duty cycle by a reference voltage to generate the feedback voltage. The multiplier produces a simple relationship between the secondary current and the reference voltage, yielding simplified current control.

Figure 1:
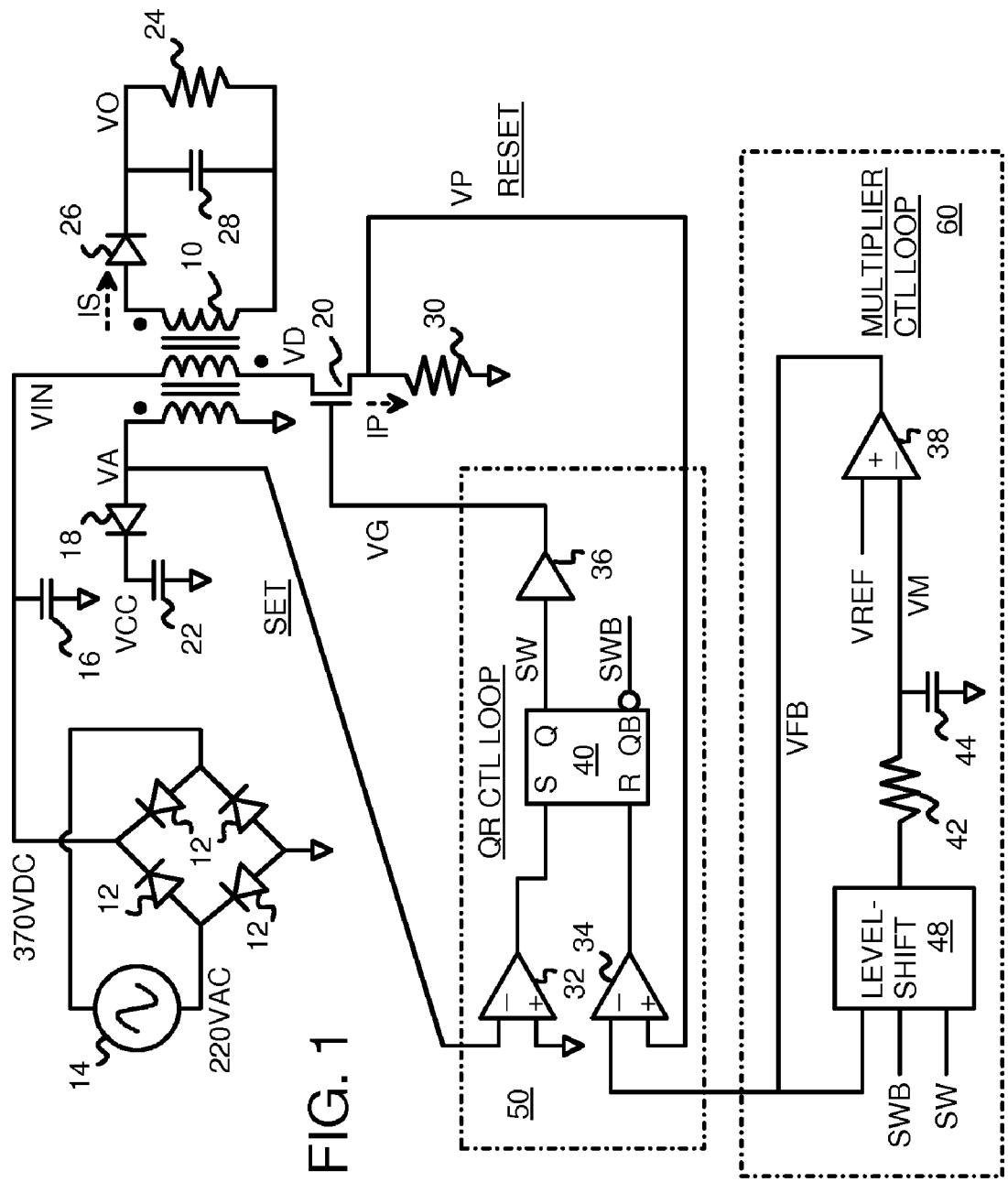
FIG. 1 is a schematic diagram of a simplified fly-back converter with a multiplier control loop that generates a feedback voltage to a Quasi-Resonant (QR) control loop that switches the primary current.

FIG. 1 is a schematic diagram of a simplified fly-back converter with a multiplier control loop that generates a feedback voltage to a Quasi-Resonant (QR) control loop that switches the primary current. Some components may be present in a real circuit that are not shown here, such as circuitry to block glitches and prevent false triggering.

AC supply 14 produces an alternating-current that is applied to a full-wave rectifier bridge of diodes 12. The DC output of the bridge of diodes 12 is connected to input voltage VIN and ground. Input capacitor 16 acts to store current and smooth out variations in VIN. For example, a 240-volt AC supply can produce a 370-volt DC signal for VIN. AC supply 14 could be a wall electrical output that is connected to a domestic AC supply or to an AC generator.

Transformer 10 can have an iron core to enhanced mutual inductance between primary windings that are connected between input voltage VIN and drain voltage VD, and secondary windings connected to secondary diode 26. A third winding in transformer 10 connects to auxiliary voltage VA. The direction of the windings in transformer 10, as shown by the dots, is such that an abrupt halt to a downward primary current IP causes a secondary current IS to flow upward due to mutual inductance in transformer 10. Likewise, an abrupt halt in primary current IP causes an auxiliary current to flow from transformer 10 to voltage VA and then forward-biased through auxiliary diode 18 to charge VCC capacitor 22 in the auxiliary loop of transformer 10.

The primary loop of transformer 10 has primary current IP flowing from capacitor 16 to VIN, then through the primary windings of transformer 10 to VD, and then through switch 20 to primary sensing voltage VP, and finally through primary sensing resistor 30 to ground. The primary current IP is measured as the current through primary sensing resistor 30, which produces a primary sensing voltage VP that is equal to the I-R drop, or VP=IP*RS, where RS is the resistance of primary sensing resistor 30.

The secondary loop of transformer 10 has secondary current IS flowing from the secondary windings of transformer 10 through forward-biased secondary diode 26 to output voltage VO. Secondary capacitor 28 stores charge to provide a more constant current through load resistor 24 when secondary current IS is not flowing from transformer 10.

The third loop of transformer 10 has auxiliary current flowing from the third windings of transformer 10 at auxiliary voltage VA, through forward-biased auxiliary diode 18 to output voltage VO. VCC capacitor 22 stores charge to provide a more constant VCC current when auxiliary current is not flowing from transformer 10. VCC is applied to components in the control module as the power supply.

Switch 20 is an n-channel transistor that has a gate controlled by gate voltage VG. The primary current through transformer 10 is abruptly cut off when gate voltage VG is switched from high to low, causing switch 10 to turn off. The primary current slowly increases when gate voltage VG is switched from low to high, causing switch 10 to turn on. The primary current increases slowly when switch 10 is turned on since the inductance of transformer 10 acts as a resistance to sudden changes in current.

Set-Reset SR latch 40 in QR control loop 50 turns switch 20 on and off. The Q output of SR latch 40 is signal SW, which is buffered by buffer 36 to generate gate voltage VG. The QB output of SR latch 40 is signal SWB.

SR latch 40 is set, driving SW and VG high to turn on switch 20 when auxiliary voltage VA falls below ground, as sensed by comparator 32 which drives the set input of SR latch 40. Thus VA falling below ground triggers the SET signal.

SR latch 40 is reset, driving SW and VG low to turn off switch 20 when primary sensing voltage VP rises above a feedback voltage VFB. Comparator 34 compares VP to VFB and drives the reset input of SR latch 40. Thus VP rising above VFB triggers the RESET signal.

The feedback voltage VFB is generated by multiplier control loop 60. Level-shift inverter 48 passes VFB from its input to its output when SW is low. When SB is high, the output of level-shift inverter 48 is grounded.

The output of level-shift inverter 48 is applied to series resistor 42 and then to filter capacitor 44, which form a low-pass filter to generate voltage VM. Voltage VM is applied to error amp 38 and compared to reference voltage Vref to generate VFB. Error amp 38 could be an op amp or other kind of amplifier. Error amp 38 has a high gain to force VM to match Vref through feedback.

Level-shift inverter 48 and the low-pass filter of series resistor 42 and filter capacitor 44 together form a multiplier that multiples the off duty cycle of switch 20 (indicted by switch signal SWB from SR latch 40) by feedback voltage VFB.

Signal VM, the multiplier output, is $$VM=VFB*Toff/T$$

where Toff is the time that SW is off, T is the total period of SW, and Toff/T is the off duty cycle of switch 20.

Error amp 38 forces VM to match Vref, or VM=Vref, so $$VM=VFB*Toff/T=Vref$$

Vref is a reference voltage that can be generated by a voltage divider, bandgap reference circuit, or from an external voltage reference.

Assuming a triangle wave, the average secondary current IS is half of the peak secondary current multiplied by the off duty cycle, when the primary current is off and the secondary current is on, or $$IS\_ave=1/2*Toff/T*IS\_peak$$

The primary and secondary currents are related by the number of windings or turns in the primary Np and the number of windings in the secondary Ns:

$$IS\_peak=Np/Ns*IP\_peak$$

Combining these equations, $$IS\_ave=1/2*Toff/T*Np/Ns*IP\_peak$$

Combining this with the earlier equation, $$VM=VFB*Toff/T=Vref$$

produces the equation $$IS\_ave=1/2*Np/Ns*Vref/VFB*IP\_peak$$

Since VFB=VP at reset by comparator 34, when the peak primary current occurs, and VP=IP_peak*RS, $$IS\_ave=1/2*Np/Ns*Vref/RS=(Np*Vref)/(2*Ns*RS)$$

Thus the average secondary current is a simple function of Vref, RS, and the ratio of windings in transformer 10. The control circuit produces a surprisingly simple function that provides for easy control of the secondary current using multiplier control loop 60 and QR control loop 50.

Figure 2:
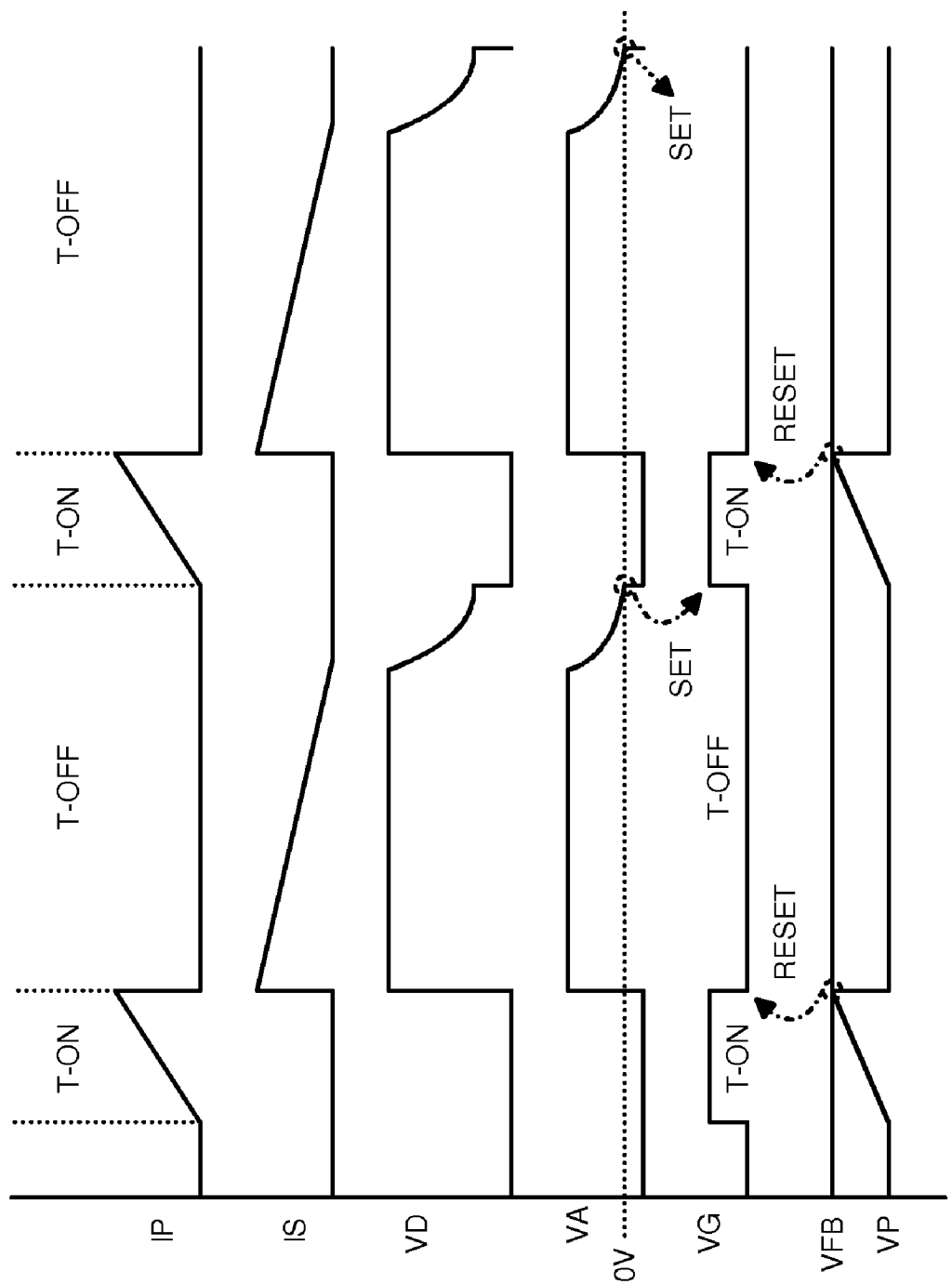
FIG. 2 is an idealized waveform or operation of the fly-back converter with multiplier control loop of FIG. 1.

FIG. 2 is an idealized waveform or operation of the flyback converter with multiplier control loop of FIG. 1. During the OFF times T-OFF, SW and gate voltage VG are low and switch 20 is turned off, preventing primary current IP from flowing.

During the ON times T-ON, SW and gate voltage VG are high and switch 20 is turned on, allowing primary current IP to flow. The primary current increases slowly since the inductance of transformer 10 prevents sudden changes in current.

As the primary current IP slowly increases during T-ON, the current through primary sensing resistor 30 increases, and its I-R voltage drop increases, increasing primary sensing voltage VP. Eventually, VP reaches the value of feedback voltage VFB generated by multiplier control loop 60, and comparator 34 drives a reset signal to SR latch 40. SW and VG toggle low, turning off switch 20 and blocking flow the of the primary current.

This sudden blockage of primary current IP by switch 20 turning off causes IP to suddenly drop to zero. The mutual inductance of transformer 10 causes secondary current IS to suddenly increase at the transition from T-ON to T-OFF. The secondary current IS then gradually falls off as the time constant of the inductance is passed.

The sudden disconnect of switch 20 also causes drain voltage VD to quickly rise as transformer 10 continues to push current through the primary windings, and this current builds up charge on the drain of switch 20, voltage VD. Drain voltage VD decays once the secondary current stops flowing, as the time constant of the mutual inductance has been reached. As secondary current goes zero, the secondary side diode 26 is reversed biased and VD swings back to zero.

Likewise, the auxiliary voltage VA also jumps above zero when the primary current stops, as mutual inductance also causes the auxiliary current to flow through the third windings of transformer 10.

As time passes, the secondary and auxiliary currents are reduced. Once these induced currents reach zero, auxiliary voltage VA falls to ground. Once VA reaches ground, comparator 32 toggles and generates a SET signal to SR latch 40. The set signal causes SR latch 40 to drive SW and VG high, ending T-OFF and beginning a new T-ON period. The primary current IP again begins to flow, and IP increases over time.

Figure 3:
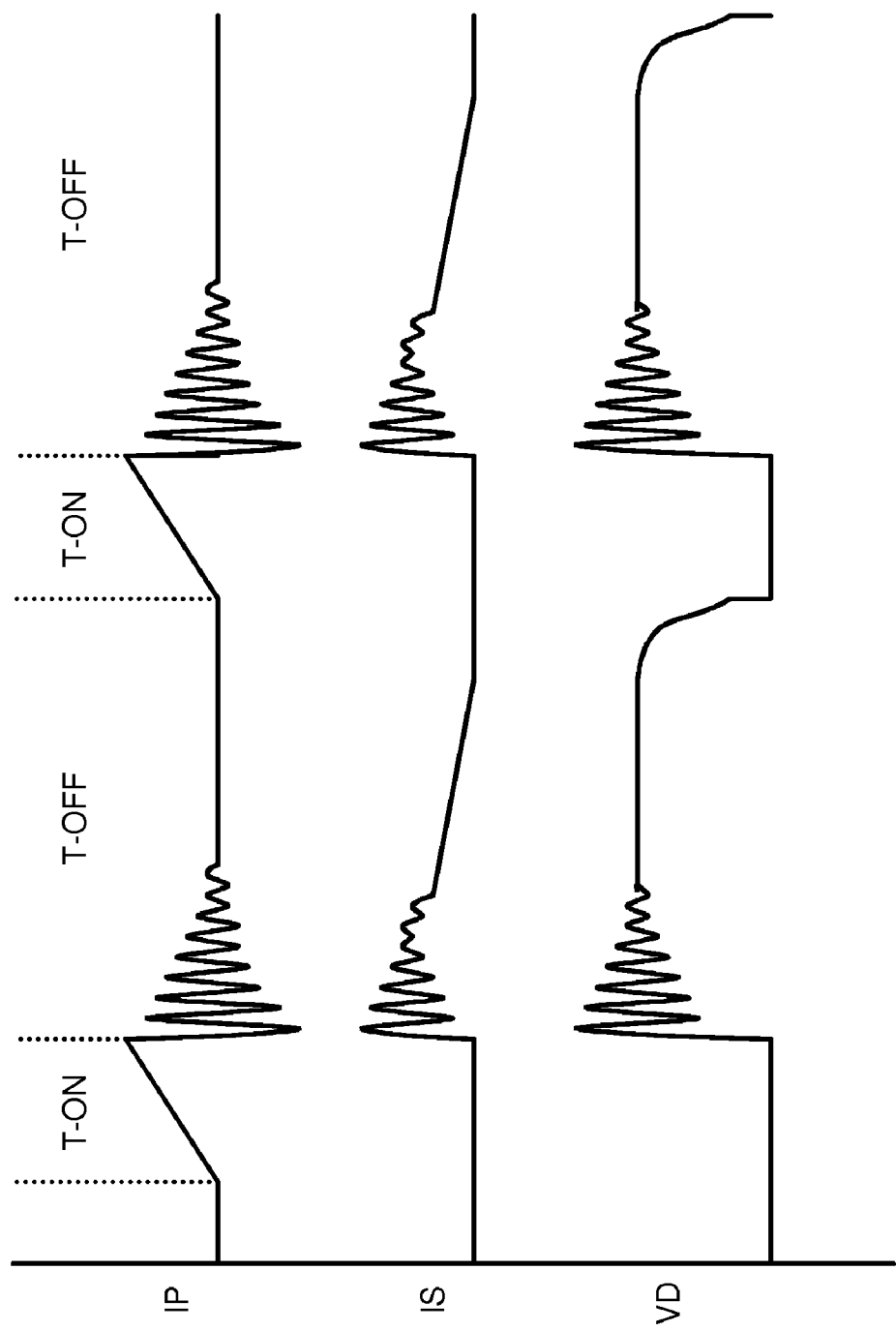
FIG. 3 shows more realistic waveforms of the operation of the converter of FIG. 1.

FIG. 3 shows more realistic waveforms of the operation of the converter of FIG. 1. The equations describing the operation of FIG. 1 are idealized. Actual circuits have parasitic components and may have other components added, such as for gating or buffering. For example, transformer 10 has a significant parasitic series resistance in the primary and secondary windings, and may have parasitic capacitances. These parasitic components create an L-R-C circuit that can cause distortion of the idealized waveforms of FIG. 2.

In FIG. 3, when T-ON ends and T-OFF begins, the sudden switching off of switch 20 blocks the primary current IP from flowing to ground. However, parasitic resistances and capacitances and reflections may cause oscillations and ringing. Both IP and IS can experience this oscillation as the currents are suddenly switched. The drain voltage VD also may experience ringing. As time elapses the amplitude of the oscillations decrease.

Figure 4:
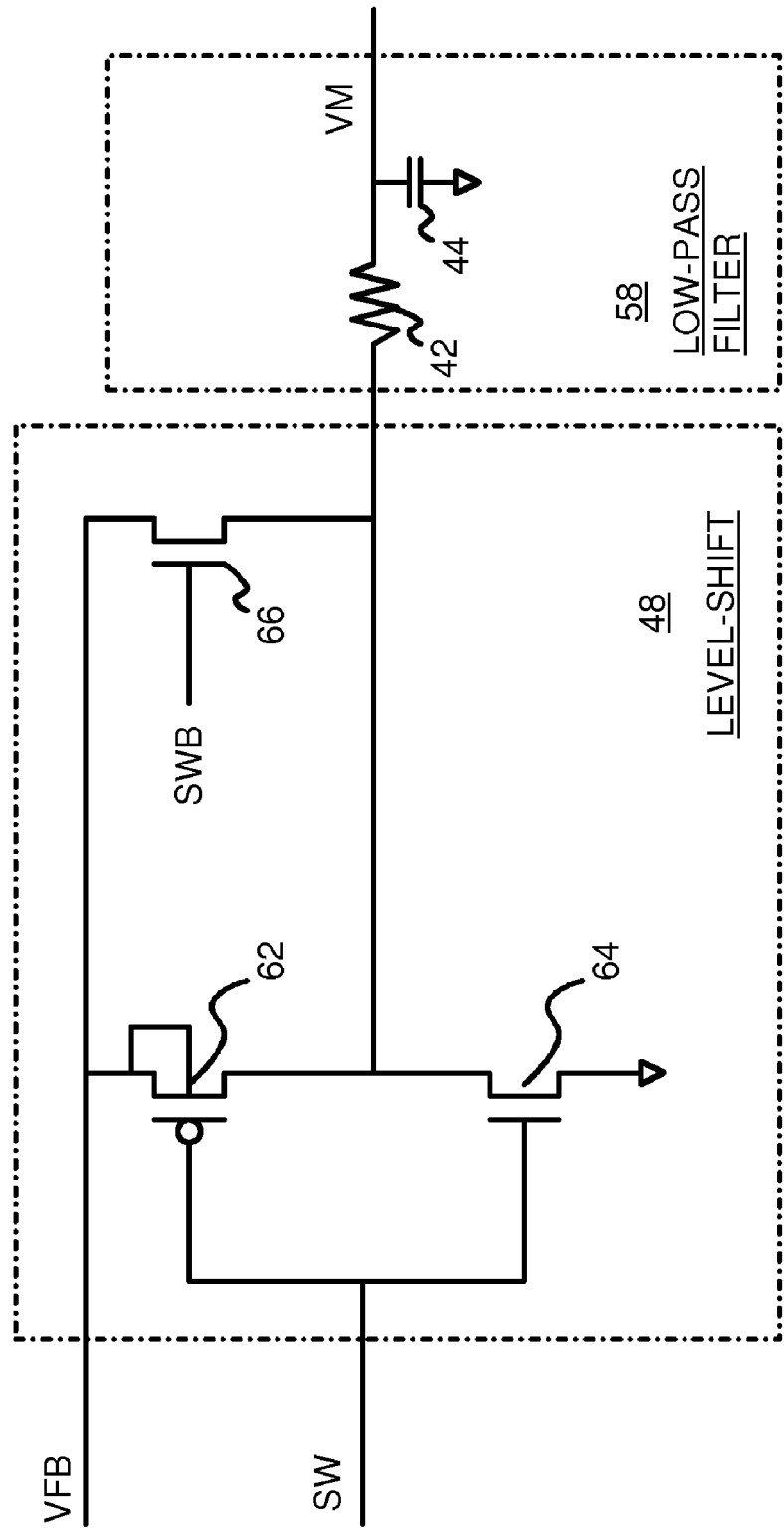
FIG. 4 is a schematic of the multiplier.

FIG. 4 is a schematic of the multiplier. Level-shift inverter 48 receives switch signals SW, SWB from SR latch 40 as control signals.

VFB is used as an internal supply signal, connecting to the source p-channel transistor 62 and to the drain of n-channel transistor 66. SW is applied to the gates of p-channel transistor 62 and n-channel transistor 64, while SWB is applied to the gate of n-channel transistor 66.

The output of level-shift inverter 48 is the drains of p-channel transistor 62 and n-channel transistor 64, and the source of n-channel transistor 66. This output connects to series resistor 42 and charges filter capacitor 44, which generates voltage VM as the filtered output of low-pass filter 58.

The bulk node of p-channel transistor 62 is connected to its source, VFB, while the bulk nodes of n-channel transistors 64, 66 can be grounded.

In operation, during T-ON when SW is high and SWB low, n-channel transistor 66 is off, p-channel transistor 62 is off, and n-channel transistor 64 is on, causing the output of level-shift inverter 48 to be driven low. Charge is removed from filter capacitor 44 during T-ON.

During T-OFF when SW is low and SWB high, n-channel transistor 66 is on, p-channel transistor 62 is on, and n-channel transistor 64 is off, causing the output of level-shift inverter 48 to be driven by VFB. Charge is added to filter capacitor 44 through series resistor 42 during T-OFF.

The amount of charge added to filter capacitor 44 depends on the length of time of T-OFF, or more properly the off duty cycle of switch signal SW, Toff/T. As the off time increases and the on time decreases, filter capacitor 44 is charged more and VM rises. The off duty cycle is multiplied by the feedback voltage VFB by this circuit.

Error amp 38 (FIG. 1) then forces VM to match Vref, adjusting VFB and the reset timing to SR latch 40 until VM equals Vref.

Figure 5:
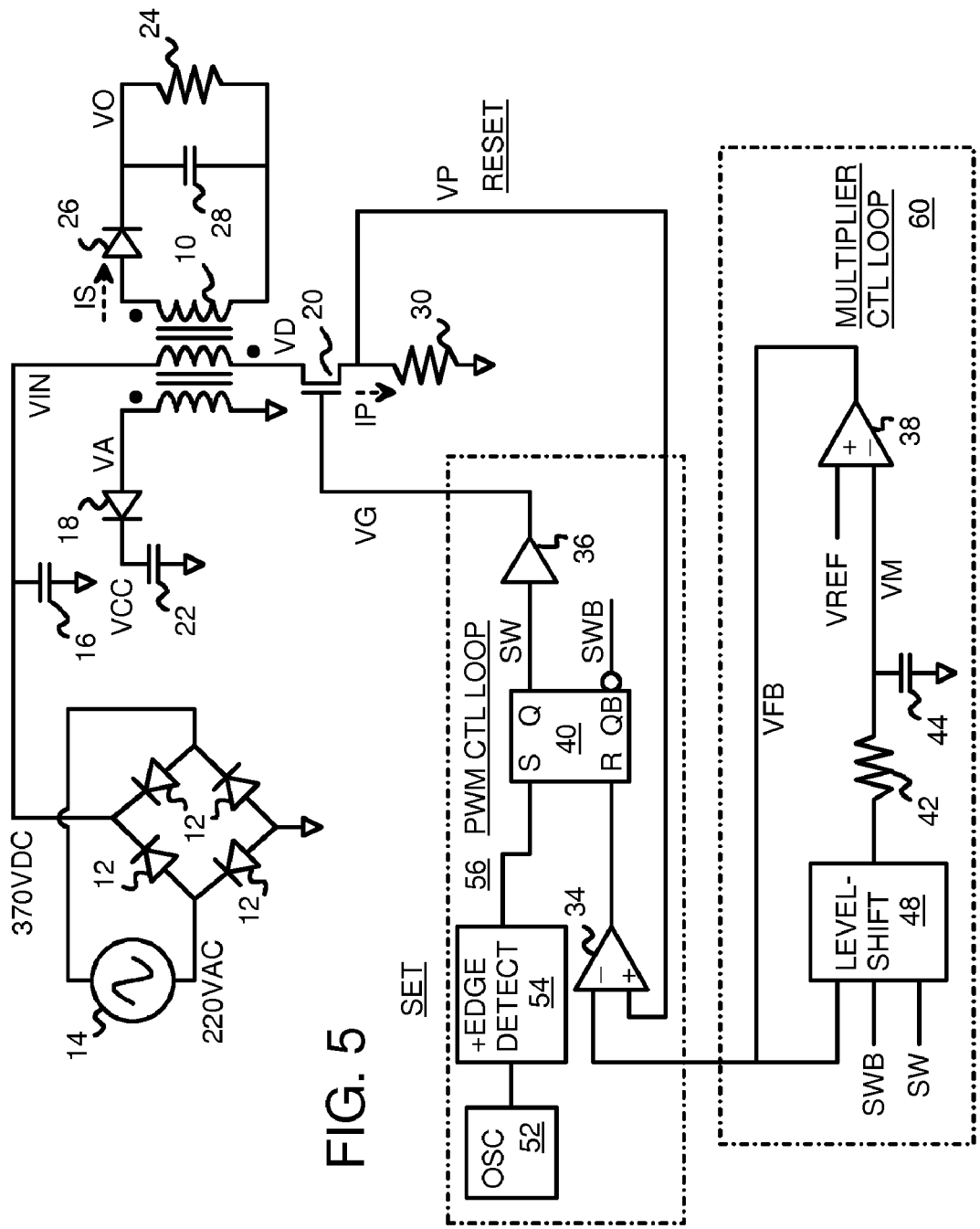
FIG. 5 is a schematic of the fly-back converter using a Pulse-Width-Modulated (PWM) control loop.

FIG. 5 is a schematic of the fly-back converter using a Pulse-Width-Modulated (PWM) control loop. Some components may be present in a real circuit that are not shown here, such as circuitry to block glitches and prevent false triggering. The power converter of FIG. 5 is similar to that of FIG. 1, but QR control loop 50 has been replaced by PWM control loop 56. PWM control tends to have higher EMI than Quasi-Resonant (QR) control and is thus somewhat less suited to solid-state lighting, LED, and charger applications. However, PWM control is simpler than QR control and may be desirable in some applications.

The PWM-controlled converter of FIG. 5 operates as described for FIG. 1, with primary current IP through transformer 10 switched on and off by switch 20 in response to gate voltage VG that is buffered by buffer 36 from switch signal SW output by SR latch 40. The IP*RS voltage drop through primary sensing resistor 30 creates primary sensed voltage VP that is compared to feedback voltage VFB by comparator 34 to generate the reset signal to SR latch 40.

Feedback voltage VFB is generated by error amp 38 comparing the filtered voltage VM to the reference voltage Vref in multiplier control loop 60. level-shift inverter 48 drives charge through series resistor 42 to filter capacitor 44, which act as a low-pass filter, and these components act as a multiplier, multiplying the off duty cycle by the feedback voltage VFB to generate filtered voltage VM.

The SET signal to SR latch 40 is generated in a different manner for PWM than for QR control. While QR control generates SET by comparison of auxiliary voltage VA (See FIG. 1), PWM control uses oscillator 52 to generate a periodic signal. Thus SET is generated using feedback to the auxiliary loop of transformer 10 in QR control, but is generated independent of feedback for PWM control.

The periodic signal or clock from oscillator 52 is applied to edge detector 54, which detects the positive or rising edge of the signal from oscillator 52. A SET pulse is generated by edge detector 54 and applied to the set input of SR latch 40. SW is driven high by SR latch 40, and buffer 36 drives gate voltage VG high to turn on switch 20 and allow primary current IP to flow through the primary windings of transformer 10.

PWM control loop 56 uses oscillator 52 to generate the set pulse, but still used feedback to generate the reset pulse. VCC generates in the auxiliary loop on VCC capacitor 22 through auxiliary diode 18 is used to power components in PWM control loop 56 and in multiplier control loop 60, including oscillator 52 and edge detector 54.

Figure 6:
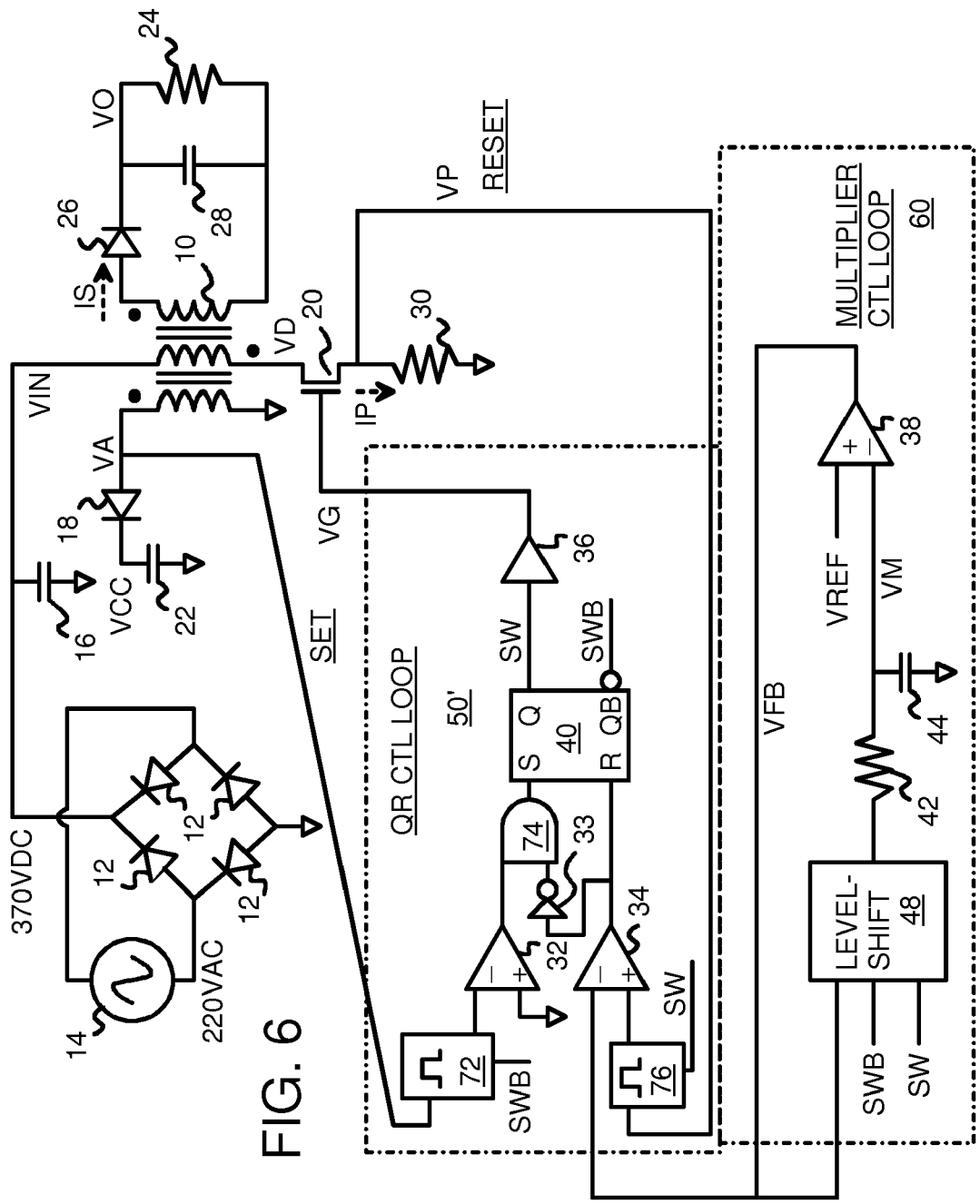
FIG. 6 is a more detailed schematic of the fly-back converter with a multiplier control loop with the Quasi-Resonant (QR) control loop of FIG. 1 with additional circuitry to prevent false triggering from glitches.

FIG. 6 is a more detailed schematic of the fly-back converter with a multiplier control loop with the Quasi-Resonant (QR) control loop of FIG. 1 with additional circuitry to prevent false triggering from glitches. Operation is similar to that described for FIG. 1. However, Leading Edge Blanking (LEB) units 72, 76 are added to block glitches from being propagated to comparators 32, 34.

Leading Edge Blanking (LEB) unit 76 isolates VP from the positive input of comparator 34 for a short time after its enable signal, SW, toggles from low to high, as well as when SW is low. Thus LEB unit 76 blocks any glitch that may be generated during switching. This glitch could otherwise cause a false trigger of the RESET when the SW is high.

Similarly, LEB unit 72 isolated auxiliary voltage VA from comparator 34 for a short time after its enable signal, SWB, toggles from low to high, as well as when SWB is low. Thus LEB unit 76 blocks any glitch that may be generated during switching. This glitch could otherwise cause a false trigger of the SET when the SWB is high. AND gate 74 and inverter 33 also block a false SET input to SR latch 40 when RESET is high.

Figure 7:
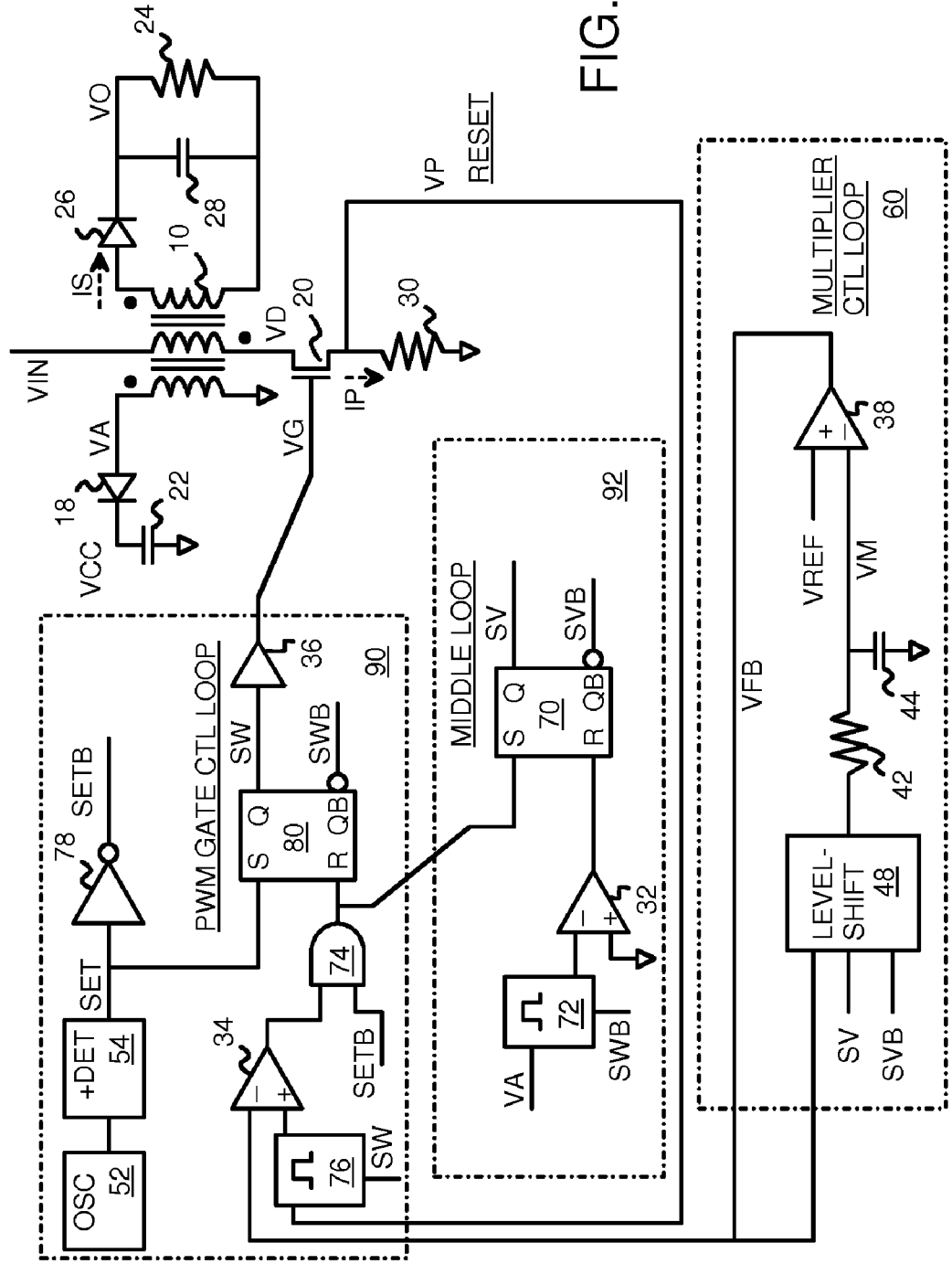
FIG. 7 is a detailed schematic of an alternate embodiment of a power converter with a more complex PWM control loop and a QR multiplier control loop.

FIG. 7 is a detailed schematic of an alternate embodiment of a power converter with a more complex PWM control loop and a multiplier control loop. This is something of a hybrid approach, using the oscillator for PWM control (FIG. 5) to begin the new cycle, and using primary comparison to VFB to switch off the primary current. However, like QR control, auxiliary sensing of VA is used to set a new latch, SR latch 70, that controls multiplier control loop 60, which generates VFB for primary comparison. Aspects of both PWM and QR control are blended together in this unusual approach.

The diode bridge is not shown in this drawing, but generates input voltage VIN as described for FIG. 1. The primary, secondary, and auxiliary loops through transformer 10 have the same components and generally operate as described for FIG. 1. However, the set signal SET is generated by oscillator 52 rather than use feedback from the auxiliary loop since PWM rather than QR control is used. However, auxiliary feedback is still used to control multiplier control loop 60.

The feedback voltage VFB is generated by multiplier control loop 60 as described for FIG. 1, except that switch signals SW, SWB are replaced with latch signals SV, SVB that are generated by SR latch 70 from secondary current detection loop, middle loop 92. SR latch 70 is used to allow the multiplier in control multiplier control loop 60 to calculate properly, as with the QR control circuit of FIG. 1.

Switch 20 that connects primary current to primary sensing resistor 30 is controlled by gate voltage VG, which is generated by buffer 36 from switch signal SW generated by SR latch 80 in PWM gate control loop 90. The SET input to SR latch 80 is generated as a clock signal from oscillator 52 and positive-edge detector 54, while inverter 78 generates SETB.

Leading Edge Blanking (LEB) unit 76 isolates VP from the positive input of comparator 34 for a short time after its enable signal, SW, toggles from low to high, as well as when SW is low, to avoid a glitch that may be generated during switching. This glitch could otherwise cause a false trigger of the RESET when the SW is high. Other kinds of glitch-blocking circuits such as AND gates with one path delayed can be substituted.

The RESET signal to SR latch 80 is generated by comparator 34 comparing primary sensing voltage VP to feedback voltage VFB. When the primary current increases and VP rises above VFB, comparator 34 toggles and drives a high signal that passes through AND gate 74 when SETB is high, driving a high pulse to the RESET input of SR latch 80. This resets SR latch 80, and SW is driven low, turning off switch 20. The low SW signal cuts off the VP signal from the RESET path of the RS latch 80 by LEB unit 76. A false positive pulse is prevented from occurring when set is occurring since SETB is input to AND gate 74.

Middle loop 92 is used to control multiplier control loop 60 in a manner similar to that described for QR control. SR latch 70 generates signals SV and SVB to level-shift inverter 48. SR latch 70 is set by the reset signal RS to SR latch 80 in PWM gate control loop 90. However, the RESET signal to SR latch 70 is generated using QR feedback.

RS latch 70 is SET by the RESET signal to RS latch 80. When SW toggles low, SV toggles high. Leading Edge Blanking (LEB) unit 72 isolates VA from the negative input of comparator 32 for a short time (such as 600 ns) after SWB toggles from low to high, as well as when SWB is low. When SWB is steadily high, and the auxiliary voltage VA falls below ground, comparator 32 toggles and drives a high signal to RESET RS latch 70. Thus the timing of multiplier control loop 60 is as described for QR control, but the timing of PWM gate control loop 90 and switch 20 is as described for PWM control.

RS latch 70 is SET by VP hitting the VFB threshold (the RESET signal of RS latch 80) and RESET by VA hitting zero (i.e. IS zero current condition).

Figure 8:
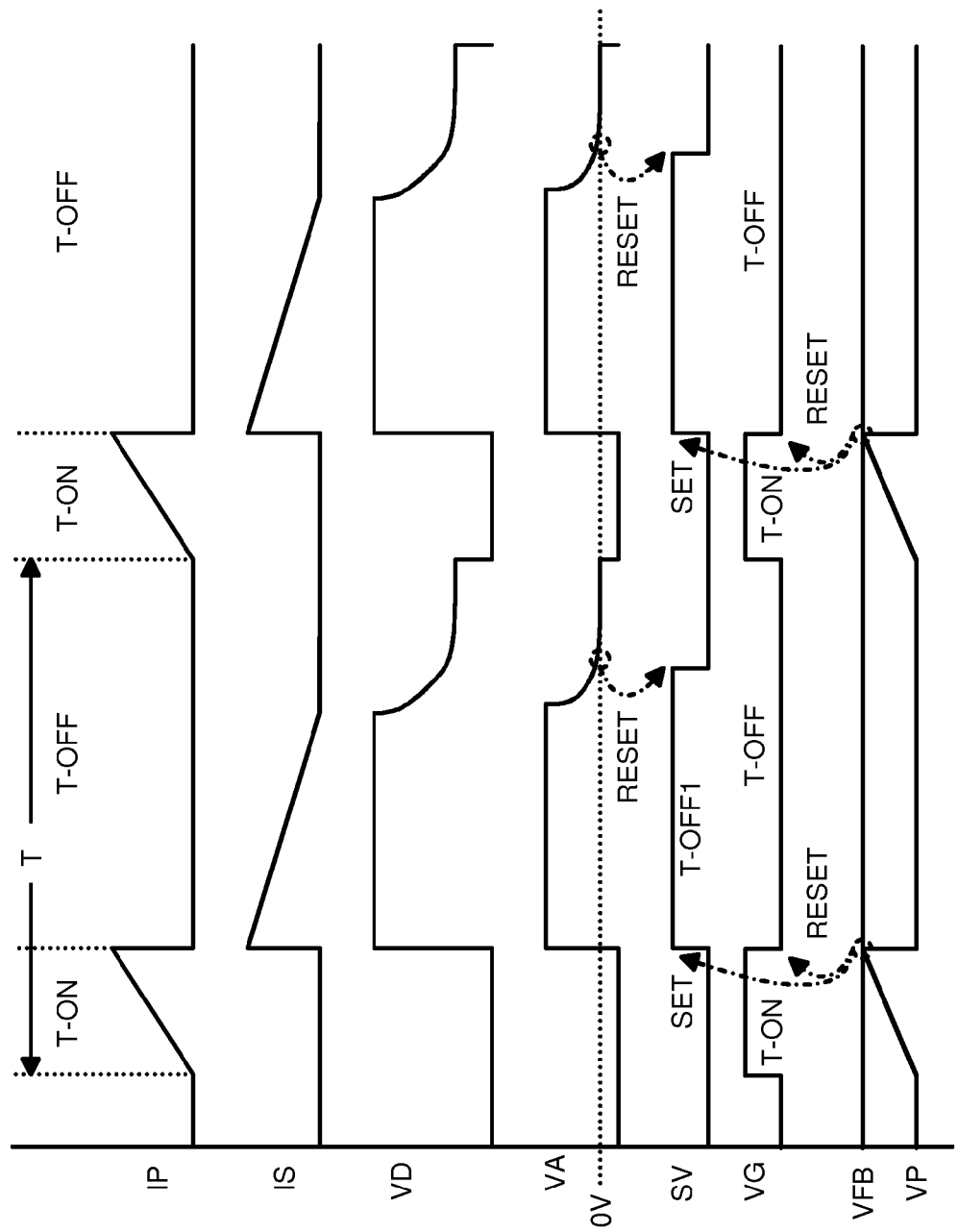
FIG. 8 is an idealized waveform or operation of the fly-back converter with multiplier control loop of FIG. 7.

FIG. 8 is an idealized waveform or operation of the flyback converter with multiplier control loop of FIG. 7. The waveform is similar to that of FIG. 2, except that PWM rather than QR control is used. However, signal SV from middle loop 92 is also shown. SV is set when primary sensing voltage VP reaches VFB, which also resets switch voltage VG, turning off switch 20 and preventing primary current IP from flowing.

SV is reset when auxiliary voltage VA falls to zero. This ends period T-OFF1. However, the gate voltage VG remains off until oscillator 52 (FIG. 7) periodically pulses, setting SR latch 80 and turning on gate voltage VG and switch 20.

The secondary current IS is only on during T-OFF1, not for the full time of T-OFF. Thus the current equation is changed to:

$$IS\_ave = 1/2 * Toff1/T * IS\_peak$$

Otherwise the equations are similar. However, while either primary current IP or secondary current IS is flowing at all times with QR control shown in FIG. 2, neither primary nor secondary current flow for some time after SV is reset, when SV is low and VG is low.

FIG. 9 is an idealized graph showing load regulation using the circuit of FIG. 1. The output current IOUT remains relatively constant as the output voltage VO is swept, such as from 1 to 4 volts. Thus output current remains constant despite variations in output voltage.

FIG. 10 is an idealized graph showing line regulation using the circuit of FIG. 1. The output current IOUT remains relatively constant as the input voltage VIN is swept, such as from 100 to 400 volts. Thus output current remains constant despite variations in input voltage.

The output current IOUT is a function of the secondary current IS, which is a function of the windings ration in transformer 10, the resistance RS of primary sensing resistor 30, and the reference voltage Vref, by the simple equation:

$$IS\_ave = 1/2 * Np/Ns * Vref/RS$$

Thus control of the output or secondary current is simplified—a value of Vref and RS can be chosen for use with a given windings ratio of transformer 10 to produce the desired output current. The control circuit can easily be integrated into standard mixed-signal integrated circuits since an opto-isolator is not needed.

Alternate Embodiments

Several other embodiments are contemplated by the inventors. For example, the multiplier may be implemented in other circuits, and level-shift inverter 48 can be implemented in a variety of ways and with various technologies. The low pass filter can have other components. P-channel rather than n-channel transistors may be used for some technologies or processes, and inversions, buffers, capacitors, resistors, gates, or other components may be added to some nodes for various purposes and to tweak the converter.

Timings may be adjusted by adding delay lines or by controlling delays in leading-edge blocking units. Pulse generators could also be added. The outputs of SR latches 40, 70, 80 may be swapped to add an inversion, and an inverter substituted for buffer 36. The inverting and non-inverting inputs to comparators may be swapped and the polarity of the output reversed. Comparators can be substituted by operational amplifiers or op amps, various kinds of comparators, or differential buffers.

Separate VCC and grounds may be used for some components. Alternately, transformer 10 may have only 2 windings rather than three, and VCC generated in some other manner, or another transformer may be used. Oscillator 52 may be a ring oscillator or an R-C delay oscillator or a clock generator or a buffer of an external clock, or may generate a periodic signal in some other manner.

Rather than use a S-R latch, a toggle flip-flop could be used with a clock that samples the set and reset inputs. Other kinds of storage elements could be used, such as flip-flops, latches, or bistable nodes. Logic gating can be used to emulate a S-R latch using other bistables, such as a D-type flip-flop with logic gates that combine the set and reset inputs to generate the D input or reset input, and these are equivalents to SR latches 40, 70, 80. The polarity of set and reset can be swapped. Active low rather than active high signals may be substituted.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A power converter comprising:
a transformer having a primary winding that receives an input voltage and outputs a drain voltage on a drain node, the transformer also having a secondary winding that outputs a secondary current that is induced by mutual induction from changes in a primary current through the primary winding;
a switch that receives the primary current from the transformer at the drain node, and is controlled by a gate voltage to switch the primary current to a primary-sensing node, wherein the switch is a metal-oxide-semiconductor field-effect transistor (MOSFET);
a primary sensing resistor coupled to the primary-sensing node and generating a primary-sensing voltage on the primary-sensing node when the switch connects the primary current to the primary sensing resistor;
a bistable latch that generates a switch signal that controls the gate voltage to the switch;
a reset comparator that receives the primary-sensing voltage and receives a feedback voltage, and generates a reset signal to the bistable latch when the primary-sensing voltage crosses the feedback voltage;
wherein the reset signal resets the bistable latch to deactivate the switch signal and drive the gate voltage to a disabling voltage that causes the switch to isolate the transformer from the primary sensing resistor;
a multiplier that receives the switch signal from the bistable latch and receives the feedback voltage, the multiplier multiplying the feedback voltage by an off duty cycle indicated by a ratio of a time that the switch signal is inactive to a period of the switch signal to generate a filtered voltage;
an error amp that receives the filtered voltage from the multiplier and receives a reference voltage, the error amp comparing the filtered voltage to the reference voltage to generate the feedback voltage; and
a set signal that sets the bistable latch to activate the switch signal and drive the gate voltage to an enabling voltage that causes the switch to conduct the primary current from the transformer to the primary sensing resistor,
whereby the primary current is switched to control the secondary current.

2. The power converter of claim 1 wherein the multiplier comprises:
a level-shift inverter that receives the feedback voltage and the switch signal and passes the feedback voltage to a filter input when the switch signal is deactivated, and passes a zero signal to the filter input when the switch signal is activated;
a low pass filter connected between the filter input and a filtered input to the error amp, the low pass filter generating the filtered voltage on the filtered input to the error amp from the filter input.

3. The power converter of claim 2 wherein the low pass filter comprises:
a series resistor between the filter input and the filtered input to the error amp;
a filter capacitor coupled to the filtered input to the error amp, the filter capacitor being charged by the level-shift inverter passing the feedback voltage when the switch signal is deactivated.

4. The power converter of claim 3 wherein the level-shift inverter comprises:
a p-channel transistor receiving the switch signal on a gate and connecting the feedback voltage to the filter input when the switch signal is inactive;
an n-channel pull-down transistor receiving the switch signal on a gate and connecting the filter input to a ground when the switch signal is active;
an n-channel connecting transistor receiving an inverse of the switch signal on a gate and connecting the feedback voltage to the filter input when the switch signal is inactive.

5. The power converter of claim 2 further comprising:
a third winding of the transformer that outputs an auxiliary current on an auxiliary node, the auxiliary current being induced by mutual induction from changes in the primary current through the primary winding;
a set comparator that connects to the auxiliary node and to a ground, the set comparator generating the set signal to the bistable latch when an auxiliary voltage on the auxiliary node crosses the ground;

wherein the set signal sets the bistable latch to activate the switch signal and drive the gate voltage to an enabling voltage that causes the switch to conduct the primary current from the transformer to the primary sensing resistor, whereby the bistable latch generates the switch signal as a Quasi-Resonant (QR) control signal.

6. The power converter of claim 5 wherein the Quasi-Resonant (QR) control signal has reduced Electro-Magnetic Interference (EMI) compared with a Pulse-Width-Modulation (PWM) control signal.

7. The power converter of claim 5 further comprising:
a secondary diode coupled between the transformer and an output node, the secondary diode carrying the secondary current from the transformer.

8. The power converter of claim 2 wherein an average of the secondary current, IS_ave, is related to the reference voltage Vref applied to the error amp, a resistance value RS of the primary sensing resistor, and a number of turns in the primary winding Np and a number of turns in the secondary winding Ns of the transformer by an equation:

$$IS\_ave = 1/2 * Np/Ns * Vref/RS.$$

9. The power converter of claim 5 further comprising:
an auxiliary diode coupled between the transformer and a VCC power supply node, the auxiliary diode carrying the auxiliary current from the transformer;
wherein the VCC power supply node powers the bistable latch, the reset comparator, the error amp, and the set comparator.

10. The power converter of claim 9 further comprising:
a connection to an alternating-current (AC) power supply having an AC+ and an AC− output;
a full-wave rectifier comprising:
    a first diode connected between the AC− output and the input voltage and forward biased from the AC− output and the input voltage;
    a second diode connected between the AC+ output and the input voltage and forward biased from the AC+ output and the input voltage;
    a third diode connected between the AC− output and a ground and forward biased from the ground to the AC− output;
    a fourth diode connected between the AC+ output and the ground and forward biased from the ground to the AC+ output;
a power capacitor coupled between the input voltage and the ground.

11. The power converter of claim 5 wherein the bistable latch is a Set-Reset SR latch having a set input and a reset input;
further comprising:
a switch buffer that receives the switch signal from the bistable latch and generates the gate voltage to the switch.

12. The power converter of claim 2 wherein the set signal is generated by an oscillator that generates a periodic signal,
wherein the bistable latch is set by the periodic signal from the oscillator for Pulse-Width-Modulation (PWM) control of the switch.

13. A multiplier-based power converter comprising:
a rectified input voltage generated from a diode rectifier on an input node;
a transformer having a primary winding for carrying a primary current between the rectified input voltage on the input node and a drain node, and having a secondary winding for carrying a secondary current for output on a secondary node, wherein the secondary current is induced by mutual inductance from changes in the primary current;
a secondary diode connected between the secondary node and an output node;
a switch transistor having a drain connected to the drain node, a source connected to a primary-sensing node, and a gate connected to a gate node;
a primary sensing resistor connected between the primary-sensing node and a ground;
a first comparator receiving a primary sensing voltage from the primary-sensing node and receiving a feedback voltage, for generating a reset signal when the primary sensing voltage rises above the feedback voltage;
a latch that is reset by the reset signal from the first comparator and set by a set signal, the latch generating a switch signal that controls a gate voltage on the gate node of the switch transistor;
a level-shift inverter that receives the switch signal from the latch and the feedback voltage, the level-shift inverter driving a filter input node with the feedback voltage when the switch signal causes the gate voltage to disable the switch transistor;
a series resistor coupled between the filter input node and a filter output node;
a filter capacitor coupled between the filter output node and a fixed voltage;
an error amplifier receiving the filter output node and a reference voltage as inputs, and amplifies a voltage difference between the reference voltage and a filtered voltage on the filter output node to generate the feedback voltage,
wherein the primary sensing voltage is generated by the primary current flowing through the primary sensing resistor, the primary sensing voltage resetting the latch and disabling the switch transistor to block the primary current when the primary sensing voltage rises to the feedback voltage,
whereby the level-shift inverter, series resistor, and filter capacitor act as a multiplier to
multiply an off duty cycle of the switch transistor by the feedback voltage.

14. The multiplier-based power converter of claim 13 wherein the latch is a Set-Reset latch;
further comprising:
a switch buffer receiving the switch signal and generating the gate voltage; and
a first leading-edge-blanking circuit, coupled to the first comparator, for blocking glitches on the primary sensing voltage from generating the reset signal.

15. The multiplier-based power converter of claim 13 further comprising:
a third winding in the transformer that carries an auxiliary current to an auxiliary node;
wherein the auxiliary current is induced by mutual inductance from changes in the primary current;
an auxiliary diode connected between the auxiliary node and an internal power-supply node;
an internal power-supply capacitor coupled between the internal power-supply node and the ground; and
a second comparator that receives an auxiliary voltage from the auxiliary node and a fixed voltage, the second comparator generating the set signal by comparing the auxiliary voltage to the fixed voltage.

16. The multiplier-based power converter of claim 15 wherein the set signal and the reset signal control the latch to generate the switch signal using a Quasi-Resonant (QR) control;
wherein the fixed voltage is the ground.

17. The multiplier-based power converter of claim 13 further comprising:
an oscillator for generating a periodic signal;
an edge detector for generating the set signal to the latch from the periodic signal,
wherein the set signal and the reset signal control the latch to generate the switch signal using a Pulse-Width-Modulation (PWM) control.

18. The multiplier-based power converter of claim 13 wherein an average of the secondary current, IS_ave, is related to the reference voltage Vref applied to the error amplifier, a resistance value RS of the primary sensing resistor, and a number of turns in the primary winding Np and a number of turns in the secondary winding Ns of the transformer by an ideal equation:

$$IS\_ave = 1/2 * Np/Ns * Vref/RS,$$

wherein a measured average secondary current is within 10 percent of a value calculated by the ideal equation.

19. A hybrid power converter comprising:
a rectified input voltage generated from a diode rectifier on an input node;
a transformer having a primary winding for carrying a primary current between the rectified input voltage on the input node and a drain node, and having a secondary winding for carrying a secondary current for output on a secondary node, wherein the secondary current is induced by mutual inductance from changes in the primary current;
a secondary diode connected between the secondary node and an output node;
a switch transistor having a drain connected to the drain node, a source connected to a primary-sensing node, and a gate connected to a gate node;
a primary sensing resistor connected between the primary-sensing node and a ground;
a first comparator receiving a primary sensing voltage from the primary-sensing node and receiving a feedback voltage, for generating a reset signal when the primary sensing voltage rises above the feedback voltage;
a latch that is reset by the reset signal from the first comparator and set by a set signal, the latch generating a switch signal that controls a gate voltage on the gate node of the switch transistor;
an oscillator for generating a periodic signal;
an edge detector for generating the set signal to the latch from the periodic signal,
wherein the set signal and the reset signal control the latch to generate the switch signal using a Pulse-Width-Modulation (PWM) control;
a middle latch that is set by the reset signal from the first comparator and reset by a middle reset signal, the middle latch generating a middle signal;
a level-shift inverter that receives the middle signal from the middle latch and receives the feedback voltage, the level-shift inverter driving a filter input node with the feedback voltage when the middle signal is activated;
a series resistor coupled between the filter input node and a filter output node;
a filter capacitor coupled between the filter output node and a fixed voltage; and
an error amplifier receiving the filter output node and a reference voltage as inputs, and amplifies a voltage difference between the reference voltage and a filtered voltage on the filter output node to generate the feedback voltage,
wherein the primary sensing voltage is generated by the primary current flowing through the primary sensing resistor, the primary sensing voltage resetting the latch and disabling the switch transistor to block the primary current when the primary sensing voltage rises to the feedback voltage,
whereby the level-shift inverter, series resistor, and filter capacitor act as a multiplier to multiply an off duty cycle of the switch transistor by the feedback voltage.

20. The hybrid power converter of claim 19 further comprising:
a third winding in the transformer that carries an auxiliary current to an auxiliary node;
wherein the auxiliary current is induced by mutual inductance from changes in the primary current;
an auxiliary diode connected between the auxiliary node and an internal power-supply node;
an internal power-supply capacitor coupled between the internal power-supply node and the ground; and
a second comparator that receives an auxiliary voltage from the auxiliary node and a fixed voltage, the second comparator generating the middle reset signal by comparing the auxiliary voltage to the fixed voltage.

* * * * *